United States Patent [19]

Sato

[11] Patent Number: 4,930,891
[45] Date of Patent: Jun. 5, 1990

[54] METHOD AND APPARATUS FOR SCANNING WAVELENGTH IN SPECTROPHOTOMETERS

[75] Inventor: Tatsumi Sato, Kyoto, Japan

[73] Assignee: Shimadzu Corporation, Japan

[21] Appl. No.: 275,362

[22] Filed: Nov. 23, 1988

[30] Foreign Application Priority Data

Dec. 14, 1987 [JP] Japan .............................. 62-318170

[51] Int. Cl.$^5$ .............................. G01J 3/06; G01J 3/42
[52] U.S. Cl. .................................... 356/326; 356/332
[58] Field of Search ............... 356/319, 326, 328, 332, 356/334

[56] References Cited

U.S. PATENT DOCUMENTS

| | | | |
|---|---|---|---|
| 3,563,656 | 2/1971 | Helms | 356/328 |
| 3,704,953 | 12/1972 | Carter et al. | 356/326 |
| 3,868,499 | 2/1975 | Aaronson et al. | 356/326 |
| 4,318,616 | 3/1982 | Chamran et al. | 356/332 |
| 4,322,807 | 3/1982 | Chamran et al. | 356/319 |
| 4,565,447 | 1/1986 | Nelson | 356/334 |

OTHER PUBLICATIONS

Aaronson et al., "A UV-VIS Spectrophotometer Controlled by a Programmable Desk-Top Calculator", *American Laboratory, vol. 7, No. 9, Sep. 1975, pp. 57, 58, 60, 62, 63.*

*Primary Examiner*—F. L. Evans
*Attorney, Agent, or Firm*—Fidelman & Wolffe

[57] ABSTRACT

In quantitative analysis of a sample by using the spectrum thereof by means of a spectrophotometer, at a specific wavelength or in a specific wavelength range where a quantitative determination is to be conducted, wavelength scanning is temporarily stopped or its speed is slowed down so as to obtain spectral data from the sample, so that the accuracy of the data obtained is improved. In the wavelength range where no quantitative determination is to be conducted, the scanning operation is conducted at an ordinary relatively fast speed, so that the total time required for the analysis will not be lengthened.

8 Claims, 4 Drawing Sheets

METHOD AND APPARATUS FOR SCANNING WAVELENGTH IN SPECTROPHOTOMETERS

BACKGROUND OF THE INVENTION

This invention relates to a method of scanning wavelength to obtain spectral data from samples, particularly for quantitative analysis, by spectrophotometers such as those for the visible and ultraviolet ranges, or fluorescence, and also to a spectrophotometer in which the method is used.

To obtain spectral data from a sample by means of a spectrophotometer, a monochromator provided therein is operated to scan a required wavelength range. During the wavelength scanning operation, when filters cutting off stray light or lamps as the light source are changed within the wavelength range, the scanning operation is temporarily stopped at each wavelength where the filter or lamp is to be changed, after which the scanning operation is resumed. In the wavelength range where spectral data are to be obtained, wavelength scanning is performed continuously at a certain speed and the measured data are taken into a data processor.

There usually exists a difference, though small, between the measured value obtained at a specific wavelength with the monochromator continuously scanning a wavelength range at a certain speed and the measured value obtained at the same specific wavelength with the monochromator being fixed at that wavelength.

There are believed to be the following two reasons for the above difference between the two measured values:

(1) A measured value does not immediately follow wavelength scanning due to delay in the response of the light measuring system of the spectrophotometer.

(2) During wavelength scanning the time for sampling spectral data is short, so that the signal-to-noise ratio decreases to adversely affect the measured value.

On the other hand, the recent marked development of computer technology, particularly, increased capacity of storage media such as random access memories (RAMs), floppy disks and, RAM cards, with simultaneous reduction in their prices, makes it possible to conduct quantitative analysis of a sample by using a computer to process spectral data obtained from the sample. A problem encountered in quantitative analysis is the above-mentioned inaccuracy of the spectral data, which directly exerts an adverse influence on the result of analysis.

The inaccuracy of spectral data can be reduced by lowering the speed of wavelength scanning, but the time required for measurement becomes longer. It is desirable to shorten the time for measurement of a sample since there are many cases where quantitative analysis is conducted to obtain a general outline of the spectrum of a sample and many samples are to be analyzed for a limited short period of time.

SUMMARY OF THE INVENTION

Accordingly, the primary object of the invention is to solve the above-mentioned and other problems and provide a method of scanning wavelength in spectrophotometers, which enables quantitative analysis of a sample by using the spectral data obtained from the sample with a high degree of precision and accuracy and without lengthening the time required for obtaining the spectral data of the sample.

Another object of the invention is to provide a spectrophotometer suitable for carrying out the method of the invention.

In accordance with the invention, in a spectrophotometer wherein the conditions for scanning wavelength are set in a control unit, which controls the wavelength scanning operation of the monochromator to obtain spectral data from a sample being measured, in addition to a wavelength range in which the operation of wavelength scanning is conducted at an ordinary constant speed, there are provided one or more specific wavelengths at which the wavelength scanning operation is temporarily stopped, or one or more specific wavelength ranges within which the scanning operation is conducted at a lower speed than the above-mentioned ordinary speed.

In accordance with the invention, in a wavelength range in which no quantitative determination is to be conducted, wavelength scanning is performed at a relatively fast constant speed. At a specific wavelength or in a specific wavelength range where a quantitative determination is to be conducted, the scanning operation is temporarily stopped or its speed is slowed down so as to obtain spectral data from the sample, so that the accuracy of the data obtained is improved. In the wavelength range where no quantitative determination is to be conducted, the scanning operation is conducted at a relatively fast speed, so that the total time required for the analysis will not become much longer than in the prior art.

DESCRIPTION OF THE PREFERRED EMBODIMENT

Figure 1:
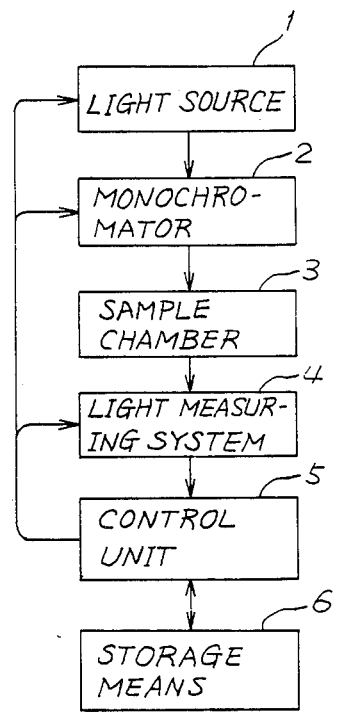
FIG. 1 is a schematic block diagram of a spectrophotometer constructed in accordance with the invention.

Referring to FIG. 1, there is shown a block diagram of a a spectrophotometer for the ultraviolet and visible ranges constructed in accordance with the invention, which comprises a light source 1, a monochromator 2, a sample chamber 3 and a light measuring system 4.

The light from the source 1 is dispersed by the monochromator 2 into a series of wavelengths, a selected one of which is introduced into the sample chamber 3, wherein the monochromatic light passes through or is reflected by a sample so as to enter the light measuring system 4, which converts the light into a corresponding electrical signal.

A control unit 5 is provided to process the output signal from the measuring system 4 to obtain the absorbance and/or transmittance of the sample under examination, which are stored in a storage 6. The control unit 5 performs various other functions such as changing lamps in the light source 1, wavelength scanning of the monochromator 2, changing filters for cutting off stray light, changing the sensitivity of a photodetector in the light measuring system 4, processing the analog signals produced by the photodetector, and other functions. The control unit 5 can be a microcomputer.

Figure 2:
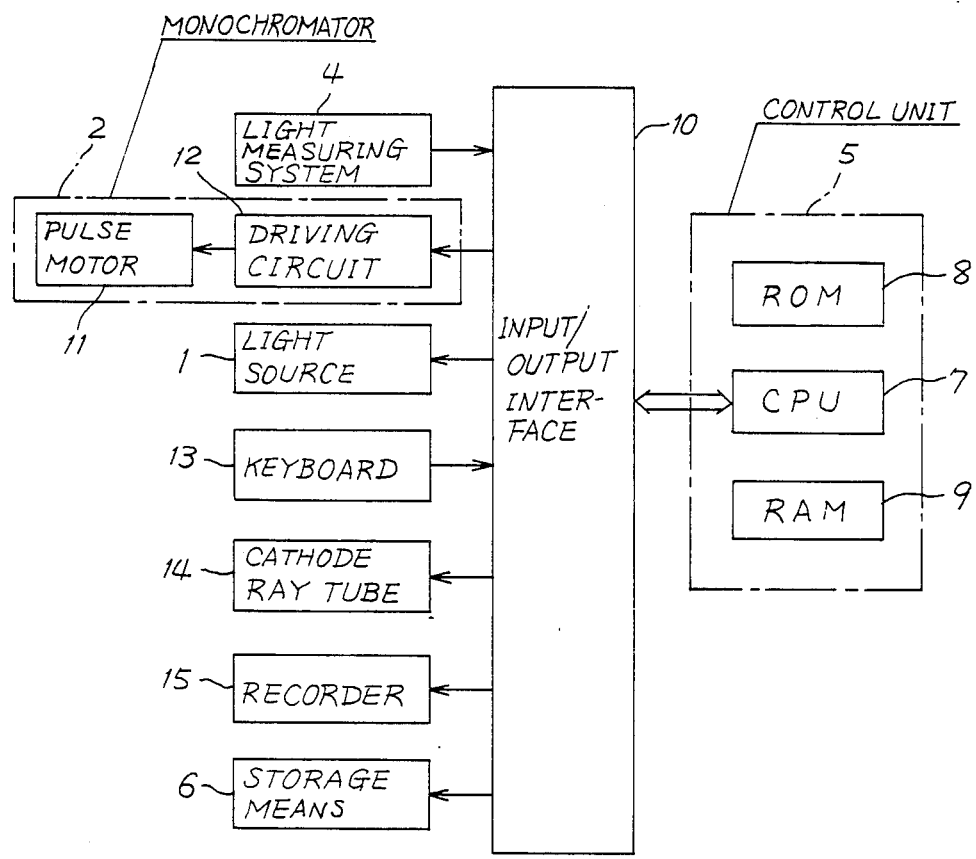
FIG. 2 is a schematic block diagram of the instrument in more detail.

Turning to FIG. 2 which shows by way of example an arrangement that a microcomputer is used as the control unit 5. The microcomputer 5 includes a read only memory (ROM) 8 for storing programs for controlling the speed of wavelength scanning for ordinary measurement, the operation of changing lamps in the light source and filters for cutting off stray light and other operations, a random access memory (RAM) 9 for setting the conditions for wavelength scanning and temporarily storing the data obtained as a result of measurement, and a central processing unit (CPU) 7 for controlling the component parts of the spectrophotometer and performing calculations necessary to obtain a required information about the sample under examination.

To the CPU 7 there are connected through an input-output interface 10 the light source 1, a circuit 12 for controlling a pulse motor 11 to drive a dispersing element (not shown) in the monochromator 2, a keyboard 13 for setting conditions for wavelength scanning, a cathode ray tube (CRT) 14 for displaying the instructions or commands for operations of the instrument and the spectral data obtained, a recorder 15 for recording the spectral data, and the storage means 6 for storing the data.

The storage means 6 can comprise nonvolatile storage media such as battery backed-up RAMs, floppy disks, RAM cards, etc.

The conditions for wavelength scanning are introduced through the keyboard 13 in an interactive mode into the RAM 9 to be stored therein.

Figure 3:
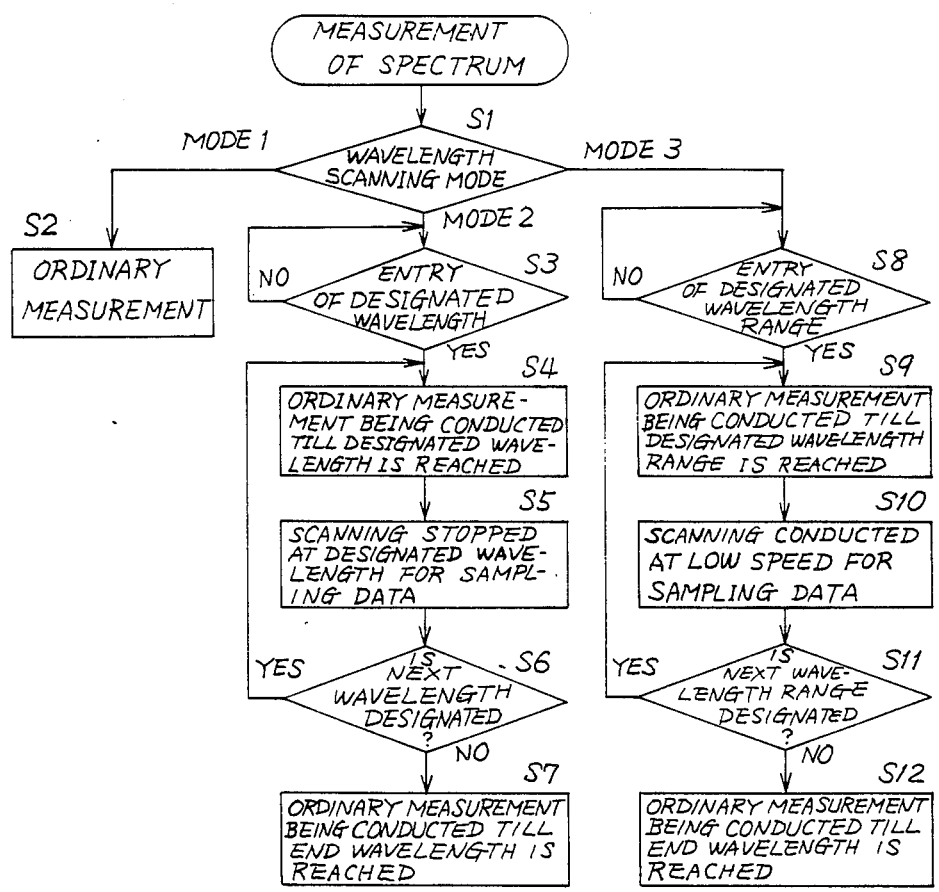
FIG. 3 is a flow chart of the three different modes of operation of the instrument shown in FIGS. 1 and 2.

The operation of the apparatus will be described in detail with reference to the flow chart shown in FIG. 3.

For measurement of a sample to obtain its spectral data there are other parameters than the conditions for wavelength scanning. The parameters, however, will not be explained for simplicity of description.

There are three different modes of wavelength scanning. Mode 1 is a mode for ordinary measurement, Mode 2 is a mode in which the wavelength scanning operation is temporarily stopped at a predetermined wavelength to sample the spectral data for the specific wavelength, and Mode 3 is a mode in which a designated wavelength range is scanned at a relatively low speed.

At step S1 one of the above three wavelength scanning modes is selected. If Mode 1 has been selected, measurement is conducted on a sample in a usual manner at step S2. In this mode, scanning is performed at a constant speed over a predetermined wavelength range to take in the spectral data except at specific wavelengths where the filter for cutting off stray light or the lamp in the light source is to be exchanged for a different filter or a different lamp.

If Mode 2 has been selected, one or more designated wavelengths are entered into the microcomputer 5 through the keyboard 13 at step S3, whereupon at step S4 wavelength scanning is initiated from the starting wavelength to proceed at an ordinary relatively fast constant speed to a first one of the designated wavelengths. At step 5 the scanning is temporarily stopped at the first designated wavelength till the value of the measured light is stabilized sufficiently, whereupon data are sampled from the sample. Whether or not the measured value has become sufficiently stable can be determined by checking whether or not the deviation from the average value of the data sampled at the first designated wavelength at several intervals is below a critical value. Then, at step S6 it is checked whether or not there is a second designated wavelength, and if there is, the scanning operation is performed at a relatively fast constant speed until the second designated wavelength is reached. The above operation is repeated until there is no more designated wavelength left, whereupon the scanning operation is conducted at the relatively fast constant speed until the end wavelength is reached at step S7.

If Mode 3 is selected at step S1, one or more designated wavelength ranges are entered at step S8 through the keyboard 13 into the microcomputer 5, whereupon at step S9 wavelength scanning is initiated from the starting wavelength to continue at an ordinary relatively fast constant speed until the first one of the designated wavelength ranges is reached. At step S10 within the first wavelength range the scanning operation is conducted at a speed low enough to spare a longer time than the response of the light measuring section of the spectrophotometer for taking data from the sample under measurement in the first wavelength range. Then, at step 11 it is checked whether or not there is a second designated wavelength range, and if there is, the scanning is performed at the ordinary relatively fast constant speed until the second designated wavelength range is reached. The above operation is repeated until there is no more designated wavelength range left, whereupon the scanning operation is conducted at the relatively fast constant speed at step 12 until the end wavelength is reached.

In either of the three modes 1, 2 and 3, the data obtained are recorded by the recorder 15 or temporarily stored in the RAM 9. If these data are to be used later, they may be stored in the nonvolatile storage medium 6 in the form of, say, a floppy disk. In the specification and claims the phrase "sampling or obtaining data" also means storing data in a storage medium.

Figure 4:
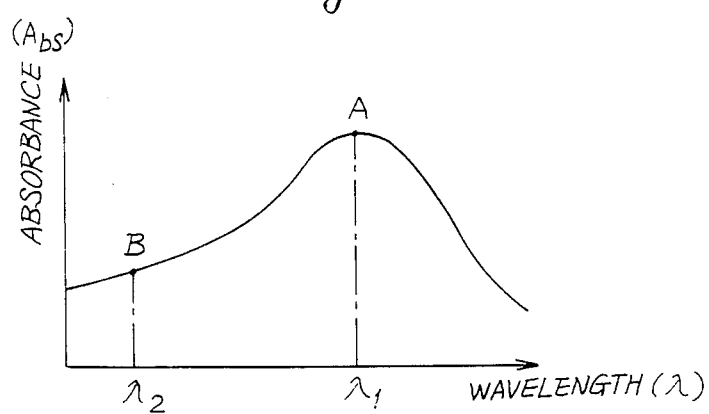
FIG. 4 is a graph showing spectral data obtained by means of the instrument operated in wavelength scanning mode 1.

FIG. 4 is a graph showing the spectral data of a sample obtained in measuring Mode 2, with absorbance (Abs) and wavelength ($\lambda$) being taken along the ordinate and abscissa, respectively.

In quantitative analysis the wavelength at which measurement for quantitative determination is conducted is predetermined in many cases. For example, if a wavelength $\lambda_1$ in FIG. 4 has been designated as such for quantitative determination, the spectral data obtained at $\lambda_1$ enables quantitative determination of the sample with a high degree of accuracy.

In a quantitative determination which uses the difference between the spectral data at two different wavelengths $\lambda_1$ and $\lambda_2$, that is, the value of $Abs(\lambda_1) - Abs(\lambda_2)$, an accurate quantitative determination can be effected by designating the wavelengths $\lambda_1$ and $\lambda_2$ as those for quantitative determination.

Figure 5:
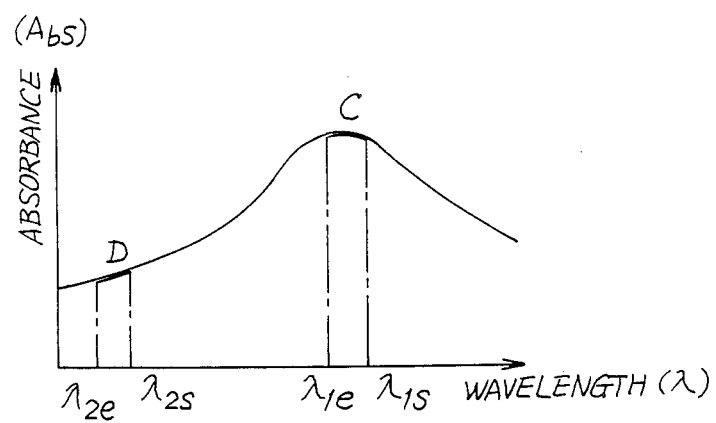
FIG. 5 is a graph showing spectral data obtained by means of the instrument operated in wavelength scanning mode 3.

FIG. 5 shows a spectral data obtained from a sample in measuring Mode 3. Mode 3 can be used in case the wavelength at which quantitative measurement is to be conducted is within a known wavelength range. In the wavelength range C from $\lambda_{1s}$ to $\lambda_{1e}$ and the range D from $\lambda_{2s}$ to $\lambda_{2e}$ in FIG. 5, wavelength scanning is conducted at a lower speed so that the data obtained in these ranges C and D are quite accurate. Therefore, if the wavelength at which measurement for quantitative determination is to be conducted exists within the range C or D, the spectral data obtained in these ranges can be used to provide an accurate quantitative determination of the sample.

Thus, in accordance with the invention, to obtain spectral data from a sample wavelength scanning is temporarily stopped at a wavelength for quantitative determination, or the scanning is conducted at a lower speed within a wavelength range including the wavelength for quantitative determination, so that an accurate quantitative determination of a sample can be effected by the spectral data obtained from the sample.

In the wavelength range where no quantitative determination need be conducted, wavelength is scanned at a relatively high speed as in the conventional method, so that the period of time required for measurement of the spectrum of a sample remains substantially the same as in the conventional method.

What I claim is:

1. Method of scanning wavelength in a spectrophotometer which comprises a light source, a monochromator for dispersing the light from said light source into a sequence of wavelengths, a sample chamber containing a sample to be analyzed, optical means for introducing the monochromatic light of a selected one of said wavelengths into said sample chamber to impinge on said sample, means for measuring the light from said sample to produce a corresponding output electrical signal, and a controller in which the conditions for wavelength scanning of said monochromator are set and which controls the wavelength scanning operation of said monochromator in accordance with said set conditions and processes said output electrical signal to obtain the spectral data of said sample; said method comprising:

setting in said controller as one of said conditions a wavelength range over which wavelength scanning is conducted at a predetermined relatively fast constant speed and within said wavelength range at least one wavelength at which wavelength scanning is stopped temporarily for a predetermined period of time long enough to allow stabilization of said output electrical signal from said light measuring means and enable subsequent sampling after said output signal has been sufficiently stabilized;

and conducting wavelength scanning in accordance with said set conditions.

2. Method of scanning wavelength in a spectrophotometer which comprises a light source, a monochromator for dispersing the light from said light source into a sequence of wavelengths, a sample chamber containing a sample to be analyzed, optical means for introducing the monochromatic light of a selected one of said wavelengths into said sample chamber to impinge on said sample, means for measuring the light from said sample to produce a corresponding output electrical signal, and a controller in which the conditions for wavelength scanning of said monochromator are set and which controls the wavelength scanning operation of said monochromator in accordance with said set conditions and processes said output electrical signal to obtain the spectral data of said sample, said method comprising:

setting in said controller as one of said conditions a first wavelength range over which wavelength scanning is conducted at a predetermined relatively fast constant speed and within said first wavelength range at least a second wavelength range over which wavelength scanning is performed at a speed sufficiently lower than the response of said light measuring means for a predetermined period of time long enough to allow stabilization of said output electrical signal from said light measuring means;

and conducting wavelength scanning in accordance with said set conditions.

3. In a spectrophotometer comprising a light source, a monochromator for dispersing the light from said light source into a sequence of wavelengths, a sample chamber including a sample to be analyzed, means for measuring the light from said sample to produce a corresponding output electrical signal, and a control unit for controlling said light source, the wavelength scanning of said monochromator, and the operation of said light measuring means and processing said output electrical signal to obtain the spectral data of said sample, the improvement that said control unit controls said monochromator so that wavelength scanning is conducted at a predetermined relatively fast constant speed over a predetermined wavelength range and temporarily stopped for at least one predetermined wavelength within said wavelength range for a predetermined period of time long enough to cause stabilization of said output electrical signal from said light measuring means and enable subsequent sampling after said output signal has been sufficiently stabilized.

4. The spectrophotometer of claim 3, wherein said control unit comprises a microcomputer connected through an input-output interface to said light source, sad monochromator and said light measuring means, said microcomputer including a read only memory for storing programs for controlling the speed of wavelength scanning of said monochromator for ordinary measurement, the operation of said light source and other operations, a random access memory for setting the conditions for wavelength scanning and temporarily storing the data obtained from said sample as a result of measurement, and a central processing unit for controlling the component parts of said spectrophotometer and performing calculations necessary to obtain a required information about said sample under measurement.

5. The spectrophotometer of claim 4, further including a keyboard connected through said input-output interface to said microcomputer for entering instructions for operation of said spectrophotometer into said microcomputer, a cathode ray tube connected through said input-output interface to said microcomputer for displaying said instructions, the spectral data of said sample under measurement and other data, a recorder connected through said input-output interface to said microcomputer for recording said spectral data, and a storage medium for storing said spectral data.

6. In a spectrophotometer comprising a light source, a monochromator for dispersing the light from said light source into a sequence of wavelengths, a sample chamber including a sample to be analyzed, means for measuring the light from said sample to produce a corresponding output signal, and a control unit for controlling said light source, the wavelength scanning of said monochromator, and the operation of said light measuring means and processing said output electrical signal to obtain the spectral data of said sample, the improvement that said control unit controls said monochromator so that wavelength scanning is conducted at a predetermined relatively fast constant speed over a predetermined first wavelength range, and so that wavelength scanning is performed at a speed sufficiently lower than the response of said light measuring means at a second wavelength range within said first wavelength range, for a predetermined period of time long enough to cause stabilization of said output electrical signal from said light measuring means.

7. The spectrophotometer of claim 6, wherein said control unit comprises a microcomputer connected through an input-output interface to said light source, said monochromator and said light measuring means, said microcomputer including a read only memory for storing programs for controlling the speed of wavelength scanning of said monochromator for ordinary measurement, the operation of said light source and other operations, a random access memory for setting the conditions for wavelength scanning and temporarily storing the data obtained from said sample as a result of measurement, and a central processing unit for controlling the component parts of said spectrophotometer and performing calculations necessary to obtain required information about said sample under measurement.

8. The spectrophotometer of claim 7, further including a keyboard connected through said input-output interface to said microcomputer for entering instructions for operation of said spectrophotometer into said microcomputer, a cathode ray tube connected through said input-output interface to said microcomputer for displaying said instructions, the spectral data of said sample under measurement and other data, a recorder connected through said input-output interface to said microcomputer for recording said spectral data, and a storage medium for storing said spectral data.

* * * * *